UNITED STATES PATENT OFFICE.

CARL RUMPFF, OF NEW YORK, N. Y., AND FRIEDRICH BAYER, FRIEDRICH WESKOTT, AND AUGUST SILLER, OF BARMEN, PRUSSIA.

IMPROVEMENT IN TREATING ANTHRACENE AND THE MANUFACTURE OF DYES.

Specification forming part of Letters Patent No. 154,153, dated August 18, 1874; application filed July 30, 1874.

*To all whom it may concern:*

Be it known that we, CARL RUMPFF, of the city and State of New York, United States of America, but at present residing in Glasgow, in the county of Lanark, North Britain, and FRIEDRICH BAYER, FRIEDRICH WESKOTT, and AUGUST SILLER, all of Barmen, in Rhenish Prussia, have invented a new and Improved Process of Oxidizing Anthracene, and Improvements in the Manufacture of Dyes and other coloring matters from the products so obtained, of which the following is a specification:

This invention, which relates to a new and improved dry process of oxidizing anthracene, and also to improvements in the manufacture of dyes and other coloring matters suitable for dyeing and printing from the anthrakinon thereby obtained, consists, first, in purifying raw commercial anthracene by hydraulic pressure, whereby the oily or fatty matters contained in it are expressed, after which the anthracene is mixed with and crystallized out of benzole, alcohol, or other suitable solvent in the ordinary manner. By this means a product containing about ninety per cent. of pure anthracene is obtained, and which is mixed with from one to five parts of powdered peroxide of manganese ($MnO_2$) to one part of anthracene. This mixture is then heated in an iron retort or other suitable close vessel to about 200° centigrade, whereby the oxygen of the peroxide of manganese becomes free, and is taken up by the anthracene, thereby directly converting the same into anthrakinon, which at the same time by this process sublimes in yellow needle-shaped crystals, and this without the employment of acid.

The anthrakinon obtained, as hereinbefore set forth, is heated in suitable vessels with about three parts of strong fuming oil of vitriol (Nordhausen acid) to one part of anthrakinon, the mixture being constantly stirred until the anthrakinon is dissolved. Anthrakinon bisulphuric acid ($C_{14}H_6O_22 + SO_3H$) is thereby obtained, which is diluted with water, and slaked lime or chalk is added to the liquid in order to remove or neutralize the excess of sulphuric acid, and at the same time form anthrakinon bisulphate of lime,($C_{14}H_6O_22 + SO_3 + Ca$,) and which is extracted from the mixture by boiling it repeatedly with water. Carbonate of soda ($NaOCO_2$) is then added to the liquid solution of anthrakinon bisulphate of lime, in order to convert the lime salt into soda salt, and the latter is separate from the insoluble carbonate of lime ($CaOCO_2$) by subsidence and filtration.

The liquid containing anthrakinon bisulphate of soda ($C_{14}H_6O_22 + SO_3Na$) is then evaporated, and after having added to and mixed with it about three parts of caustic soda (Na OH) to one part of anthrakinon bisulphate of soda, the mixture is fused until a small portion thereof, when dissolved in water, shows a blue-violet color, and the addition of hydrochloric acid carries down a copious precipitate of alizarine, which precipitate does not increase upon further fusing the mass, and again treating a portion of it as hereinbefore described.

When this point is reached the fused mass which contains alizarate of soda ($C_{14}H_6Na2O_4$) is dissolved in water, and alizarine is precipitated by adding a suitable acid (hydrochloric acid being generally employed.) The alizarine so obtained is then purified by washing it with sufficient water and by pressure, thereby removing the by-products, and the alizarine is thereby rendered fit for dyeing and printing purposes.

It is to be understood that, although we have hereinbefore given certain proportions in which the different substances may be mixed together for the purposes of this invention, we do not confine ourselves precisely to these proportions, as good results may be obtained with other proportions of admixture of these substances.

In conclusion we would state that we do not broadly claim the production of alizarine from anthracene or its derivatives.

What we claim, and desire to secure by Letters Patent, is—

The mode of obtaining anthrakinon from anthracene, by the dry and direct process of heating anthracene with peroxide of manganese, as hereinbefore described.

In testimony whereof we have signed our names to this specification in the presence of two subscribing witnesses.

CARL RUMPFF. [L. S.]
FRIED. BAYER. [L. S.]
FRIED. WESKOTT. [L. S.]
AUG. SILLER. [L. S.]

Witnesses as to CARL RUMPFF:
GEORGE MACAULAY CRUIKSHANK,
JOHN MACNISH.

Witnesses as to FRIED. BAYER, FRIED. WESKOTT, and AUG. SILLER:
FR. AUG. HARDT,
J. FERD. KOENCURE.